United States Patent
Terasawa (10) Patent No.: US 10,823,450 B2
(45) Date of Patent: Nov. 3, 2020

(54) AIR-CONDITIONING REGISTER

(71) Applicant: TOYODA GOSEI CO., LTD., Kiyosu-shi, Aichi-ken (JP)

(72) Inventor: Kengo Terasawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 233 days.

(21) Appl. No.: 15/903,076

(22) Filed: Feb. 23, 2018

(65) Prior Publication Data
US 2018/0283729 A1 Oct. 4, 2018

(30) Foreign Application Priority Data
Mar. 31, 2017 (JP) .................. 2017-070267

(51) Int. Cl.
*F24F 13/14* (2006.01)
*B60H 1/34* (2006.01)

(52) U.S. Cl.
CPC ....... *F24F 13/1413* (2013.01); *B60H 1/3421* (2013.01); *F24F 13/1426* (2013.01);
(Continued)

(58) Field of Classification Search
CPC .............. F24F 13/1413; F24F 13/1426; F24F 13/1473; B60H 1/3421; B60H 2001/3471; B60H 2001/3478
(Continued)

(56) References Cited

U.S. PATENT DOCUMENTS 2,113,240 A * 4/1938 Pierson ............... F24F 13/1426
49/52
3,147,768 A * 9/1964 Kennedy ............ F24F 13/1413
137/614.11
(Continued)

FOREIGN PATENT DOCUMENTS

DE 10 2014 100 441 A1 7/2015
DE 10 2015 101 116 A1 8/2015
(Continued)

OTHER PUBLICATIONS

Extended European Search Report dated Sep. 14, 2018 issued in corresponding EP patent application No. 18156313.1.

*Primary Examiner* — Steven B McAllister
*Assistant Examiner* — Allen R Schult
(74) *Attorney, Agent, or Firm* — Posz Law Group, PLC (57) ABSTRACT

An air-conditioning register includes a rotation direction changing mechanism, which changes the rotation direction of an operation knob and transmits the rotation to a shut-off damper to tilt the shut-off damper about damper pivots. The rotation direction changing mechanism includes arm portions and a cam member. Each arm portion includes a sliding end portion at the distal end, which moves along an arcuate passage having a center that coincides with the damper pivots in accordance with the tilting motion. A cam groove of the cam member includes sliding regions, along which the sliding end portions slide when the shut-off damper is tilted. Each sliding region includes free running regions on its opposite ends. The moving amount of the sliding end portions along the arcuate passage in the free running regions is less than that in an intermediate region when the cam member is rotated by a certain angle.

4 Claims, 10 Drawing Sheets

(52) U.S. Cl.
CPC .............. *B60H 2001/3471* (2013.01); *B60H 2001/3478* (2013.01); *F24F 2013/1473* (2013.01)

(58) Field of Classification Search
USPC ........................................................ 454/155
See application file for complete search history.

(56) References Cited

U.S. PATENT DOCUMENTS

| | | |
|---|---|---|
| 2002/0081965 A1 | 6/2002 | Demerath et al. |
| 2015/0202946 A1 | 7/2015 | Inagaki et al. |
| 2017/0259649 A1 | 9/2017 | Shibata et al. |
| 2017/0326951 A1 | 11/2017 | Frenzel et al. |

FOREIGN PATENT DOCUMENTS

| | | |
|---|---|---|
| DE | 20 2016 002 951 U1 | 9/2017 |
| JP | 3958030 B2 | 5/2007 |
| JP | 2014-034280 A | 2/2014 |
| JP | 2014-088115 A | 5/2014 |
| JP | 2014-091377 A | 5/2014 |
| JP | 2016-159721 A | 9/2016 |
| JP | 2017-159876 A | 9/2017 |
| JP | 2017-206068 A | 11/2017 |
| JP | 2018-016228 A | 2/2018 |

\* cited by examiner

Fig.13B

AIR-CONDITIONING REGISTER

BACKGROUND OF THE INVENTION

The present invention relates to an air-conditioning register that blows out air-conditioning air, which is delivered from an air conditioner, through the outlet of an airflow passage. More specifically, the present invention relates to an air-conditioning register having a shut-off damper for opening and closing the airflow passage.

Vehicles have air-conditioning registers that are installed in the instrument panel and blow air-conditioning air delivered from an air conditioner through outlets. One example of such an air-conditioning register includes fins arranged in order from the outlet at the downstream end of the airflow passage toward the upstream end, a shut-off damper, an operation knob for operating the fins and the shut-off damper, a transmission shaft, and a rotation direction changing mechanism (for example, refer to German Patent Application Publication No. 102015101116 and German Patent Application Publication No. 102014100441). The transmission shaft extends in the flowing direction of the air-conditioning air. The rotation direction changing mechanism changes the rotation direction of the transmission shaft and transmits the rotation to the shut-off damper. The rotation direction changing mechanism is located between the upstream end of the transmission shaft and the shut-off damper. According to German Patent Application Publication No. 102015101116 and German Patent Application Publication No. 102014100441, a bevel gear mechanism is employed as the rotation direction changing mechanism. The transmission shaft is coupled to the operation knob and the rotation direction changing mechanism with Cardan joints such as universal joints and ball joints.

With this configuration, the fins are tilted by moving the operation knob in the lateral direction and the vertical direction to change the direction in which the air-conditioning air is blown out through the outlet. The shut-off damper is tilted between an open position, where the airflow passage is opened, and a closed position, where the airflow passage is closed by rotating the operation knob.

In an air-conditioning register, which uses Cardan joints as described above, the following problem arises by rotating the operation knob when the intersecting angle between the axis of the operation knob and the axis of the transmission shaft is great or when the intersecting angle between the axis of the transmission shaft and the axis of the rotation direction changing mechanism is great. That is, a rotational misalignment caused between the operation knob and the rotation direction changing mechanism is increased. The rotational misalignment is small when the intersecting angle is small, but is increased as the intersecting angle is increased. For example, if the operation knob is rotated by 90° when the intersecting angle is 0°, the rotation direction changing mechanism is rotated by 90°. However, as the intersecting angle is increased, the rotation direction changing mechanism is rotated by more than or less than 90°.

Thus, for example, even if the operation knob is rotated by a proper angle in the direction to close the airflow passage, the shut-off damper may be tilted beyond the closed position due to the rotational misalignment. In this case, the shut-off damper contacts the inner wall surface of the retainer, which defines the airflow passage. In this case, load is applied to the operation knob, the rotation direction changing mechanism, and components located between the operation knob and the rotation direction changing mechanism. In contrast, if the shut-off damper is not tilted to the closed position, the airflow passage is not closed, and a gap is created between the shut-off damper and the inner wall surface of the retainer. Thus, the air-conditioning air leaks from the gap.

For example, even if the operation knob is rotated by a proper angle in the direction to fully open the airflow passage, the shut-off damper may have an inclination with respect to the flowing direction of the air-conditioning air due to the rotational misalignment and may hinder the flow of the air-conditioning air.

SUMMARY OF THE INVENTION

Accordingly, it is an objective of the present invention to provide an air-conditioning register that eliminates excessive or insufficient tilting of a shut-off damper, thereby properly opening and closing an airflow passage.

In accordance with one aspect of the present invention, an air-conditioning register is provided that includes a rotation direction changing mechanism, which changes a rotation direction of an operation knob transmitted through a transmission shaft extending in a flowing direction of air-conditioning air in an airflow passage and transmits the rotation to a shut-off damper to tilt the shut-off damper between an open position and a closed position about damper pivots. The rotation direction changing mechanism includes an arm portion, which extends from the shut-off damper, and a cam member, which includes a cam groove on an outer surface. The arm portion includes a sliding end portion, which moves along an arcuate passage having a center, which coincides with the damper pivots in accordance with the tilting motion of the shut-off damper. The sliding end portion is slidably engaged with the cam groove. The transmission shaft is coupled to the operation knob with a first Cardan joint. The transmission shaft is coupled to the cam member with a second Cardan joint. The cam groove includes a sliding region, along which the sliding end portion slides when the shut-off damper is tilted between the open position and the closed position. The sliding region includes a free running region on each of opposite ends of the sliding region. The moving amount of the sliding end portion along the arcuate passage in each free running region is less than that in an intermediate region at an intermediate section of the sliding region when the cam member is rotated by a certain angle.

With this configuration, when the operation knob is rotated, the rotation is transmitted to the rotation direction changing mechanism via the downstream-side Cardan joint, the transmission shaft, and the upstream-side Cardan joint. The cam member of the rotation direction changing mechanism is rotated about its own axis. The cam groove is also rotated about the axis in accordance with the rotation of the cam member. The section of the sliding region in which the sliding end portion of the arm portion is engaged changes along the arcuate passage, which has the center coinciding with the damper pivots, in accordance with the rotation of the cam groove. The shut-off damper is tilted between the open position and the closed position about the damper pivots in accordance with the above change. The operation knob and the shut-off damper are rotated and tilted in different directions. However, the rotation direction changing mechanism changes the rotation direction of the operation knob and transmits the rotation to the shut-off damper to tilt the shut-off damper.

The rotation is transmitted regardless of the intersecting angle between the axes of the transmission shaft and the operation knob and regardless of the intersecting angle between the axes of the transmission shaft and the cam member.

DETAILED DESCRIPTION OF THE PREFERRED EMBODIMENTS

An air-conditioning register for a vehicle according to one embodiment will now be described with reference to the drawings.

In the following description, the direction in which the vehicle advances (moves forward) will be referred to as the front, and the reverse direction will be referred to as the rear. The height direction of the vehicle will be referred to as a vertical direction of the vehicle. The width direction (the lateral direction) of the vehicle is defined with reference to the state in which the vehicle is viewed from the rear.

In the passenger compartment, an instrument panel is located in front of the front seats of the vehicle (the driver's seat and the front passenger seat). The instrument panel incorporates air-conditioning registers at the center and the sides with reference to the left-right direction (the vehicle width direction). The main functions of the air-conditioning registers are to change the direction of air-conditioning air, which is delivered from the air conditioner and discharged through the outlets to the passenger compartment, and to adjust the amount of discharged air. Adjusting the discharge amount includes stopping the air discharge.

Figure 1:
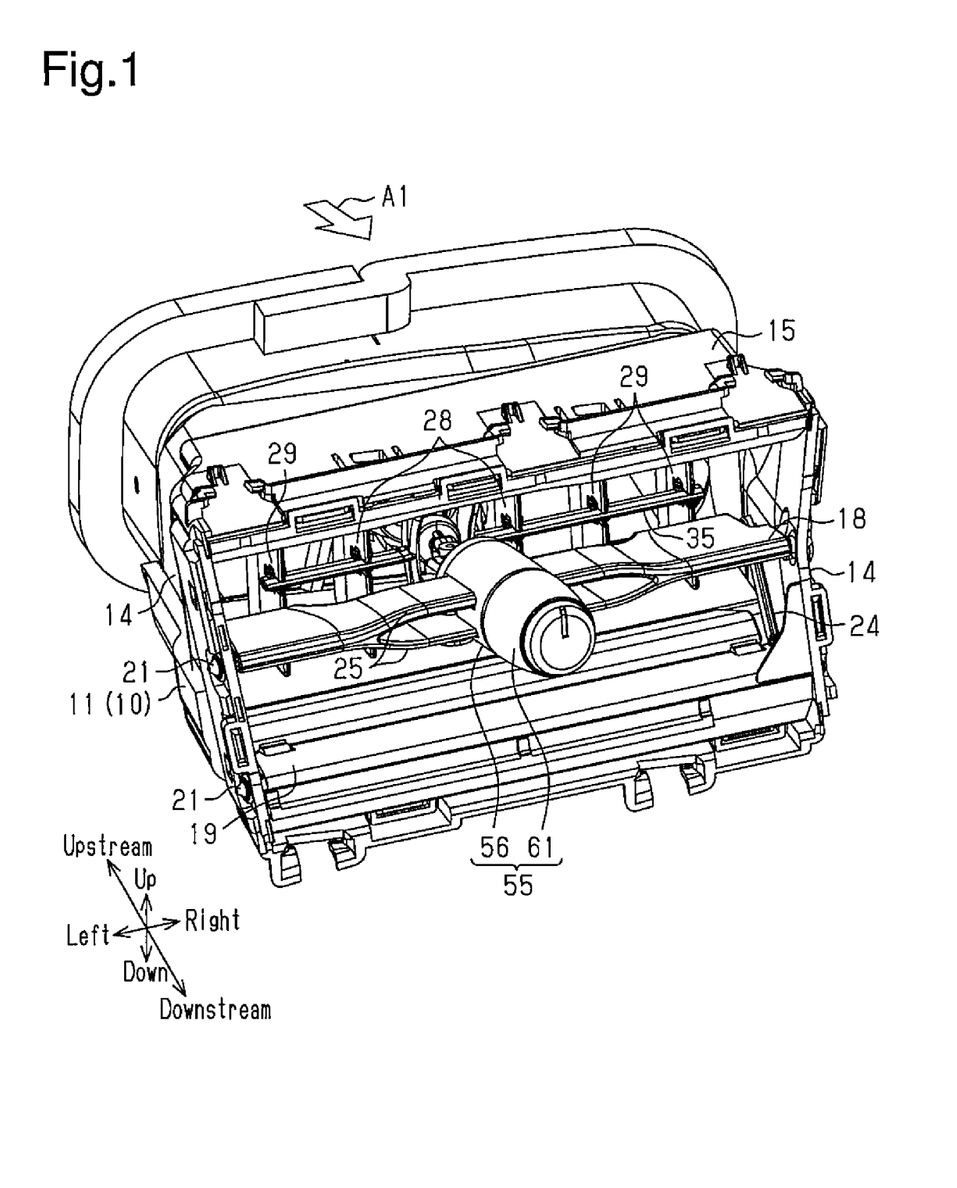
FIG. 1 is a perspective view of an air-conditioning register.
Figure 6:
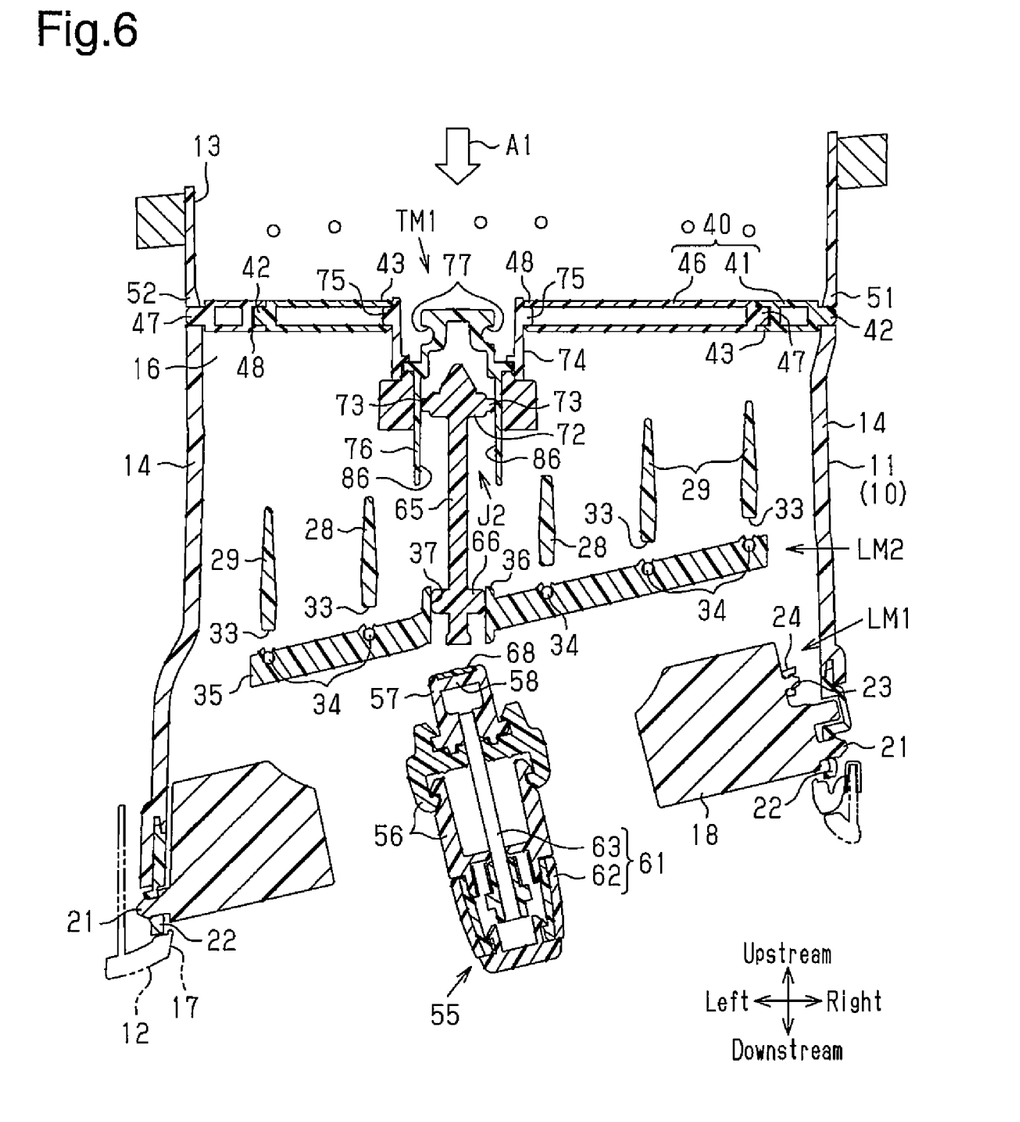
FIG. 6 is a cross-sectional plan view of the air-conditioning register.
Figure 8:
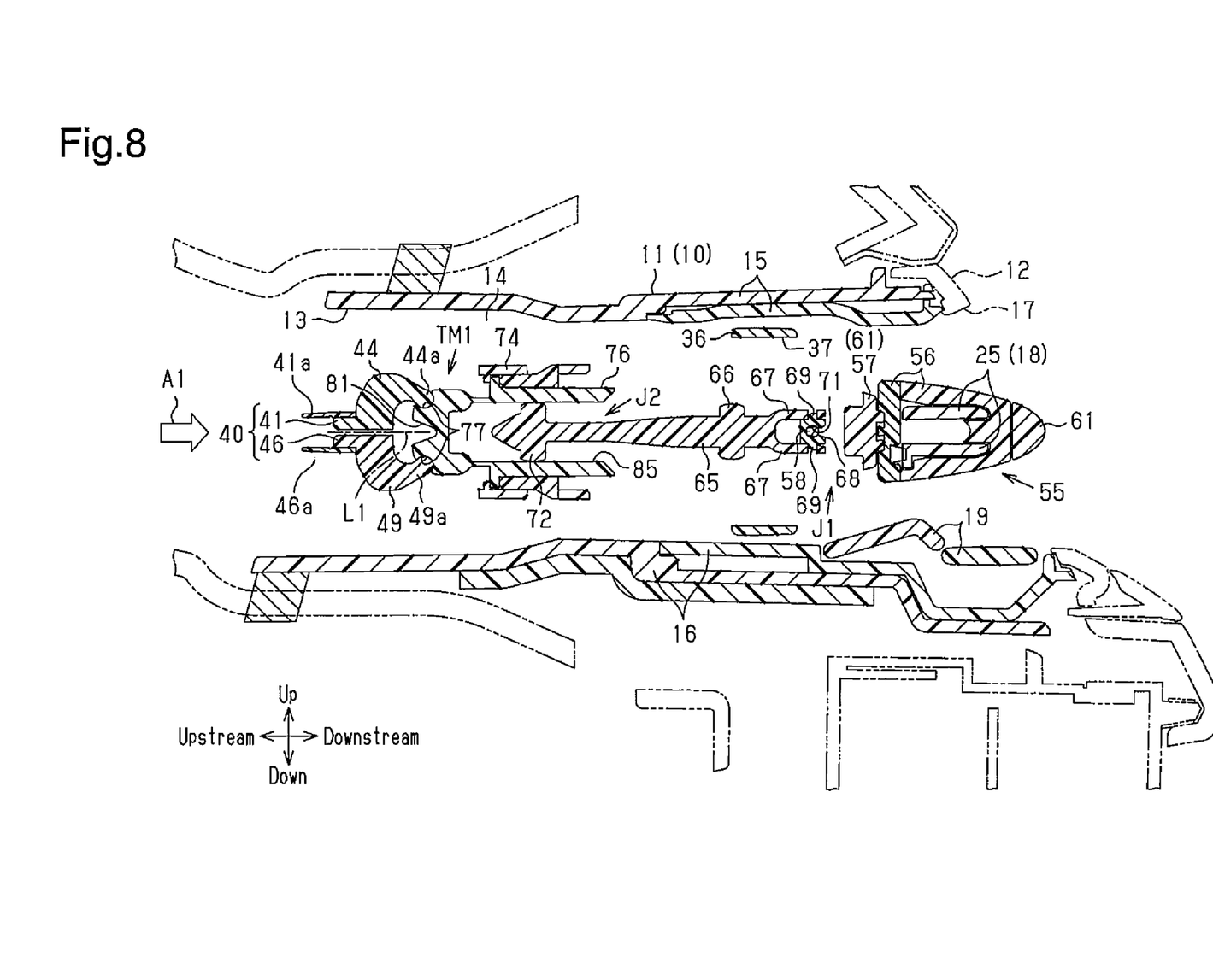
FIG. 8 is a cross-sectional side view of the air-conditioning register.

As shown in FIGS. 1, 6, and 8, the air-conditioning register includes a retainer 10, a downstream fin set, an upstream fin set, a shut-off damper 40, and an operation knob 55. FIG. 1 omits illustration of a bezel 12 on the retainer 10. The structure of each component constituting the air-conditioning register will now be described.

<Retainer 10>

The retainer 10 is configured to connect the duct (not shown) of the air conditioner to the opening (not shown) in the instrument panel and includes a retainer body 11 and the bezel 12 as shown in FIGS. 6 and 8.

The interior space of the retainer 10 constitutes a passage for air-conditioning air A1 (hereinafter, referred to as an airflow passage 13). With regard to the direction in which the air-conditioning air A1 flows, the side closer to the air conditioner is referred to as "upstream," or "upstream side," and the side farther from the air conditioner will be referred to as "downstream," or "downstream side."

The airflow passage 13 is surrounded by four walls of the retainer 10. These four walls include two side walls 14, which face each other in the lateral direction, and an upper wall 15 and a bottom wall 16, which face each other in the vertical direction.

The bezel 12 constitutes the most downstream part of the retainer 10. The bezel 12 has an outlet 17 at the downstream end of the airflow passage 13. The air-conditioning air A1 is blown out through the outlet 17. The end face on the downstream side of the bezel 12 about the outlet 17 constitutes a design surface of the air-conditioning register.

<Downstream Fin Set>

Figure 2:
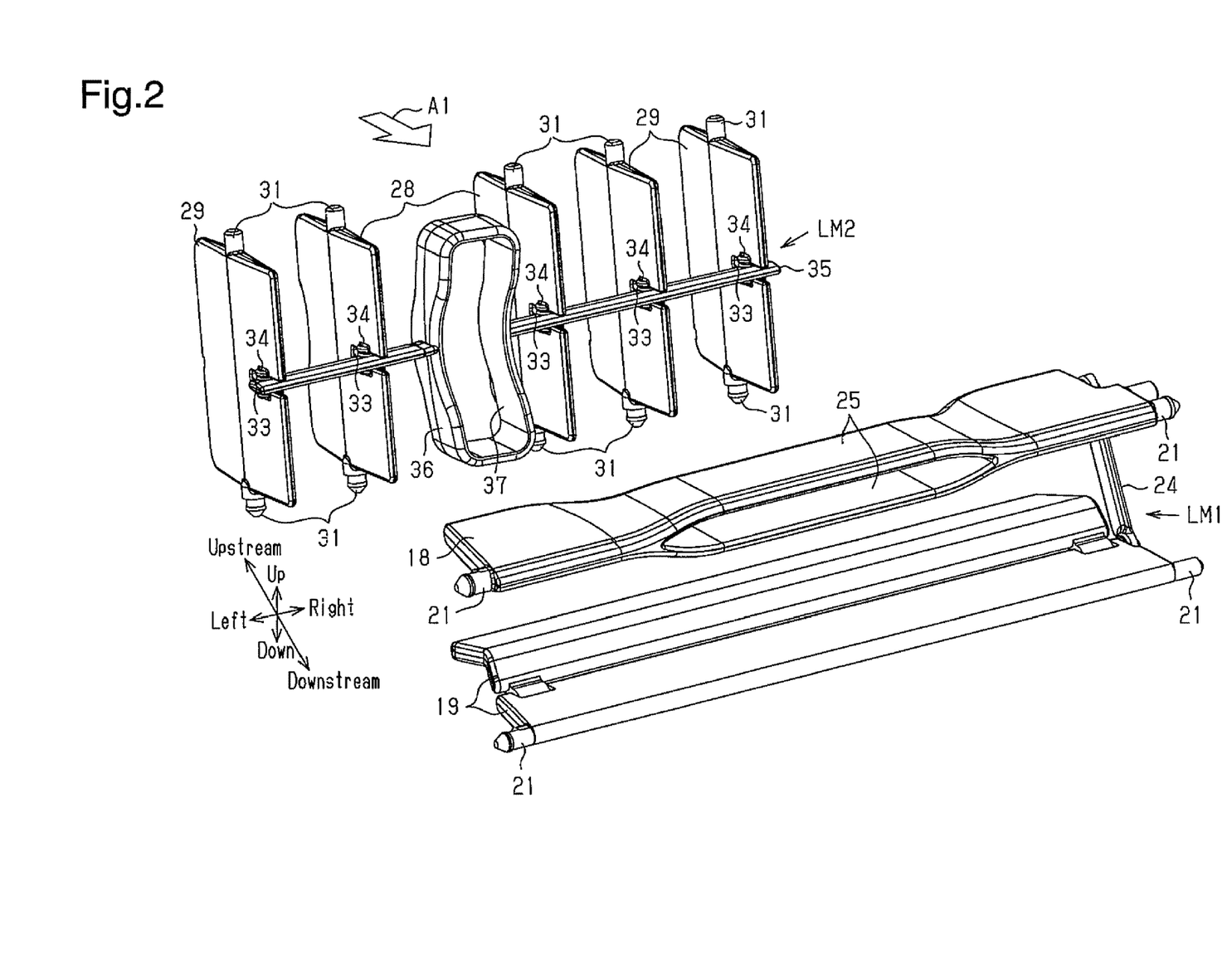
FIG. 2 is a perspective view showing some of the components of the air-conditioning register.

As shown in FIGS. 2 and 8, the downstream fin set includes multiple (two in the present embodiment) downstream fins 18, 19 arranged apart from each other in the vertical direction. The downstream fins 18, 19 are used to change the direction in which the air-conditioning air is discharged through the outlet 17 upward and downward. The downstream fins 18, 19 are mainly constituted by plate-shaped members, which extend in the lateral direction and the flowing direction of the air-conditioning air A1 in the airflow passage 13.

As shown in FIGS. 2 and 6, each of the downstream fins 18, 19 has downstream fin pivots 21 on the end faces in the lateral direction. The downstream fin pivots 21 extend in the lateral direction. The downstream fin pivots 21 are positioned at the downstream ends of the downstream fins 18, 19 in the flowing direction of the air-conditioning air A1. The downstream fin pivots 21 of the downstream fins 18, 19 are supported by the side walls 14 with bearing portions 22.

Each of the downstream fins 18, 19 has a coupling pin 23 in a section displaced upstream from one (the right one in the present embodiment) of the downstream fin pivots 21. The coupling pin 23 extends in parallel with the downstream fin pivot 21. The coupling pins 23 of the downstream fins 18, 19 are coupled together by a vertical coupling rod 24 extending in substantially the vertical direction. The coupling pins 23 and the vertical coupling rod 24 constitute a link mechanism LM1, which mechanically couples the downstream fins 18, 19 positioned one above the other in the vertical direction and tilts the lower downstream fin 19 in synchronization with the upper downstream fin 18 so that the lower downstream fin 19 has the same inclination as that of the upper downstream fin 18.

The upper downstream fin 18 has a tubular portion 25 at the center in the lateral direction. The tubular portion 25 is integrated with the upper downstream fin 18. The upstream end and the downstream end of the tubular portion 25 are open (refer to FIG. 8). The tubular portion 25 has a flattened shape such that the lateral dimension is greater than the vertical dimension.

<Upstream Fin Set>

The upstream fin set is constituted by multiple upstream fins arranged on the upstream side of the downstream fin set in the airflow passage 13. The upstream fins are used to change the direction in which the air-conditioning air A1 is blown out from the outlet 17 leftward and rightward. The upstream fins are each constituted by a plate-shaped member, which extends in the vertical direction and in the flowing direction of the air-conditioning air A1 in the airflow passage 13. Most of the upstream fins are arranged to be substantially parallel with each other, while being equally spaced apart in the lateral direction.

To distinguish the upstream fins, the adjacent two upstream fins at the center in the lateral direction will be referred to as central upstream fins 28, and the remaining ones will be referred to as upstream fins 29. When there is no need to distinguish the upstream fins, these will be collectively referred to as the upstream fins 28, 29 in some cases.

Figure 9:
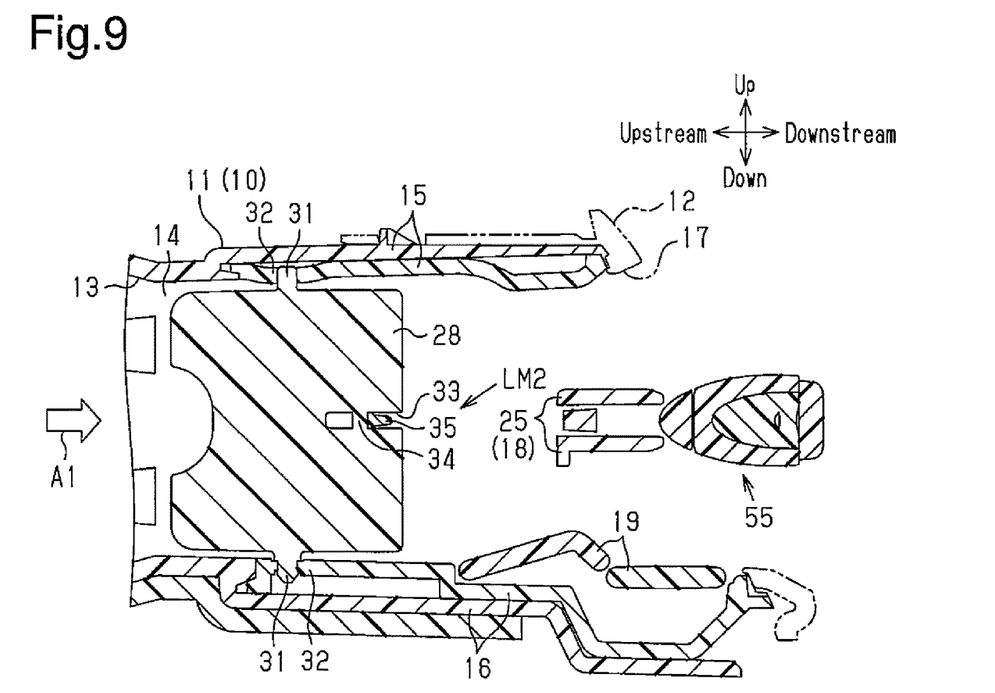
FIG. 9 is a partial cross-sectional side view of the air-conditioning register along a section different from FIG. 8.

As shown in FIGS. 2 and 9, each of the upstream fins 28, 29 has upstream fin pivots 31 on the end faces in the vertical direction. The upstream fin pivots 31 extend in the vertical direction. The upstream fin pivots 31, which extend from the end faces of each of the upstream fins 28, 29, are substantially positioned at the centers of the upstream fins 28, 29 in the flowing direction of the air-conditioning air A1. The upstream fin pivots 31, which extend from the end faces of each of the upstream fins 28, 29, are tiltably supported by the upper wall 15 and the bottom wall 16 with bearing portions 32.

As shown in FIGS. 2, 6, and 9, each of the upstream fins 28, 29 has a cutout portion 33 and a coupling pin 34. The cutout portions 33 are positioned in the downstream portions of the upstream fins 28, 29 in the flowing direction of the air-conditioning air A1. The cutout portions 33 are also positioned at the centers of the upstream fins 28, 29 in the vertical direction. Each coupling pin 34 extends from the associated cutout portion 33 in the vertical direction in a section displaced downstream from the upstream fin pivots 31. The coupling pins 34 of the upstream fins 28, 29 are coupled together by a lateral coupling rod 35 extending substantially in the lateral direction. The coupling pins 34 and the lateral coupling rod 35 constitute a link mechanism LM2, which tilts all the upstream fins 28, 29 in synchronization so that all the upstream fins 28, 29 have the same inclination.

<Shut-Off Damper 40>

Figure 3:
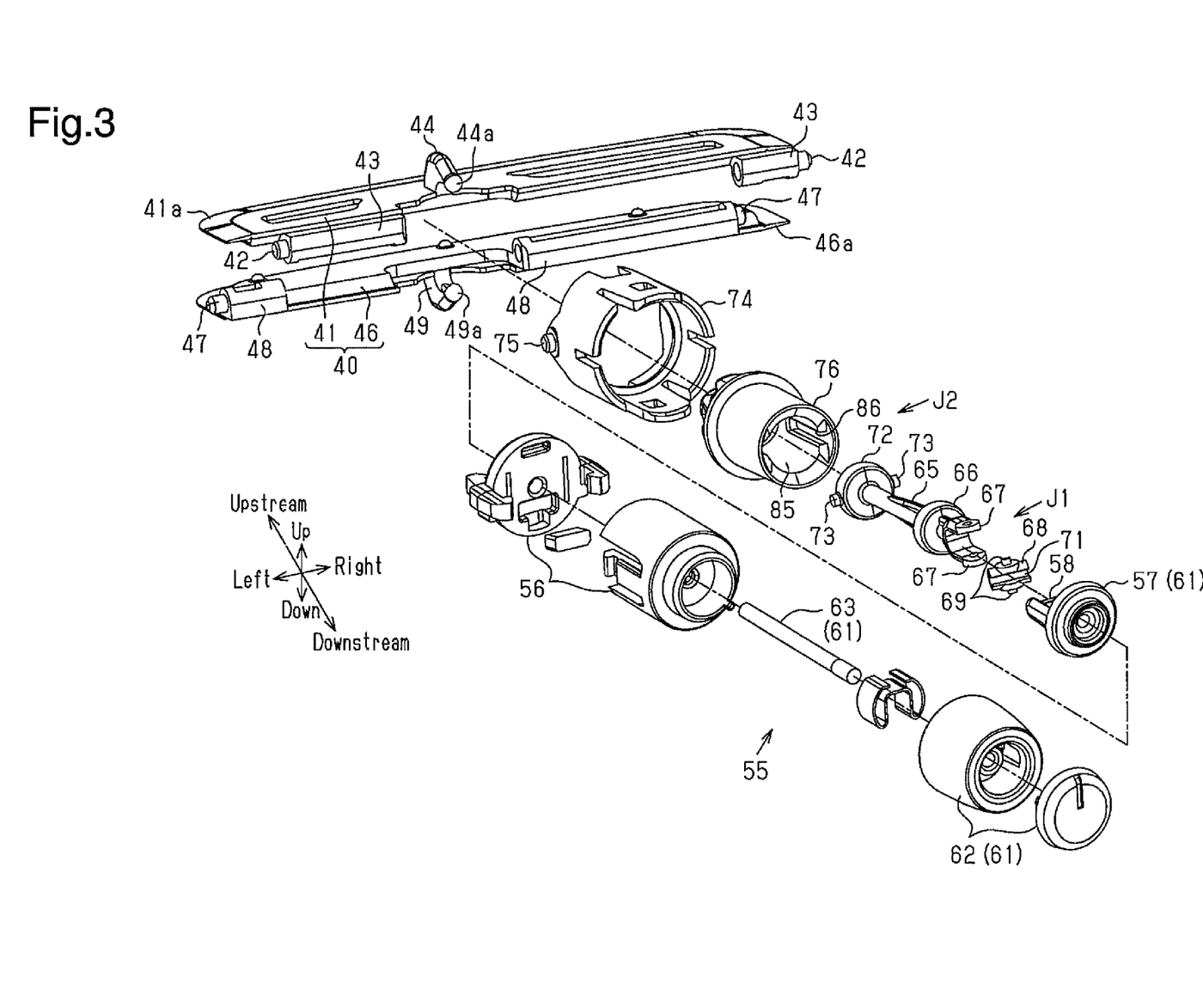
FIG. 3 is a perspective view showing some of the components of the air-conditioning register.

As shown in FIGS. 3 and 6, the shut-off damper 40 is located in the retainer 10 at a location upstream of the upstream fin set to selectively open and close the airflow passage 13. The shut-off damper 40 includes a pair of upper and lower damper plates 41, 46. The damper plates 41, 46 are rectangular and are longer in the lateral direction than in the flowing direction of the air-conditioning air A1. The damper plates 41, 46 respectively include flexible sealing members 41a, 46a formed at the periphery of the damper plates 41, 46. The sealing members 41a, 46a are thinner than other section of the damper plates 41, 46.

The upper damper plate 41 has damper pivots 42 extending in the lateral direction at the opposite ends in the lateral direction. The upper damper plate 41 has two bearing portions 43 located between the damper pivots 42 and spaced apart from each other in the lateral direction. The lower damper plate 46 has damper pivots 47 extending in the lateral direction at the opposite ends in the lateral direction. The lower damper plate 46 has two bearing portions 48 located between the damper pivots 47 and spaced apart from each other in the lateral direction. The damper pivots 42, 47 and the bearing portions 43, 48 are aligned along the same line on the downstream ends of the damper plates 41, 46.

The damper pivot 42 on the right end of the upper damper plate 41 is supported by the right side wall 14 with a bearing portion 51. The damper pivot 42 on the left end of the upper damper plate 41 is supported by the lower damper plate 46 with the bearing portion 48.

The damper pivot 47 on the left end of the lower damper plate 46 is supported by the left side wall 14 with a bearing portion 52. The damper pivot 47 on the right end of the lower damper plate 46 is supported by the upper damper plate 41 with the bearing portion 43.

Figures 11A, 11B:
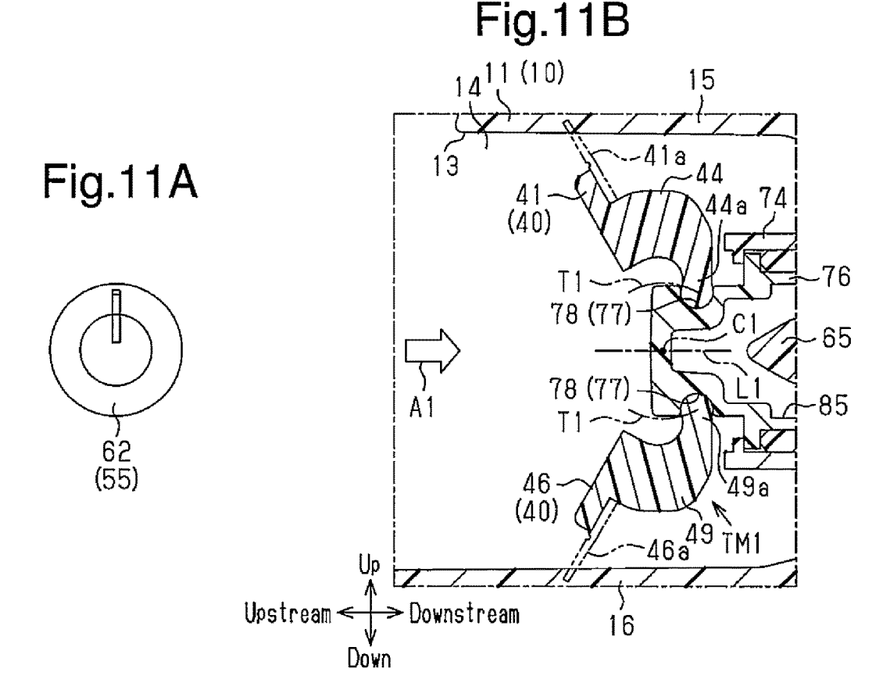
FIG. 11A is a front view of the operation knob when the damper plates are tilted to a closed position.
FIG. 11B is a partial cross-sectional side view of the shut-off damper and the surrounding section when the damper plates are tilted to the closed position.
Figure 12A:
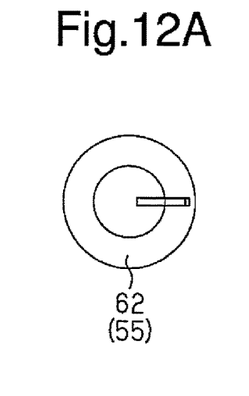
FIG. 12A is a front view of the operation knob when the damper plates are tilted to the open position.
Figure 12B:
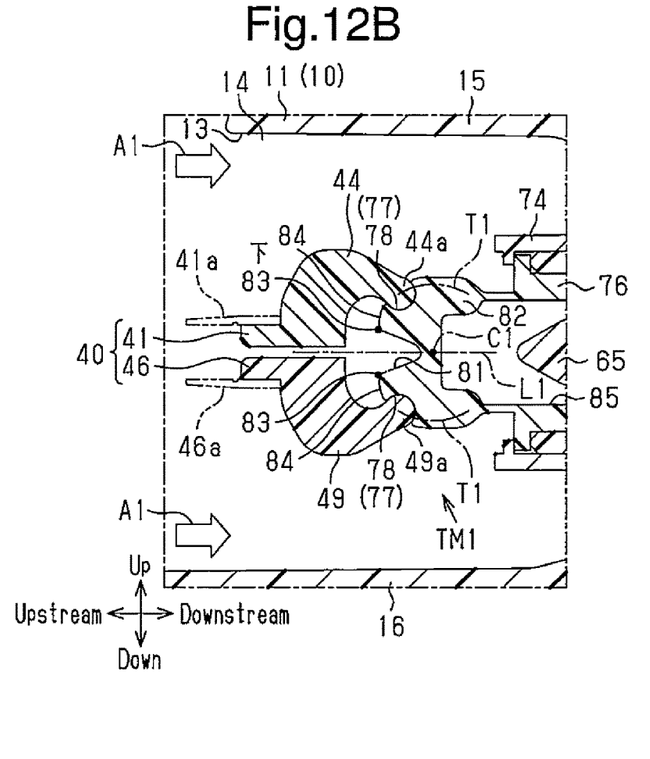
FIG. 12B is a partial cross-sectional side view of the shut-off damper and the surrounding section when the damper plates are tilted to the open position.

The damper plates 41, 46 are tiltable in the opposite directions between an open position and a closed position about the damper pivots 42, 47. In the open position, the damper plates 41, 46 are substantially at the center between the upper wall 15 and the bottom wall 16 as shown in FIGS. 8 and 12B. In this position, the damper plates 41, 46 are substantially parallel with the upper wall 15 and the bottom wall 16 to largely open the airflow passage 13. In the closed position, the shut-off damper 40 is largely inclined relative to the upper wall 15 and the bottom wall 16 as shown in FIG. 11B. In this state, the shut-off damper 40 contacts the upper wall 15 and the bottom wall 16 to close the airflow passage 13.

<Operation Knob 55>

As shown in FIGS. 1, 6, and 8, the operation knob 55 is a member operated by an occupant to tilt the downstream fins 18, 19, the upstream fins 28, 29, and the shut-off damper 40, independently. The operation knob 55 is formed by assembling multiple members. The members broadly include members constituting a knob body 56 and members constituting a rotation member 61. The knob body 56 is mounted on the tubular portion 25 of the upper downstream fin 18 to be slidable in the lateral direction.

As shown in FIGS. 3, 6, and 8, the rotation member 61 includes a knob portion 62 and a shaft portion 63. The knob portion 62 is rotationally mounted on the knob body 56. A stopper (not shown) is provided between the knob body 56 and the knob portion 62. The stopper permits the knob portion 62 to be rotated within an angular range between a closing indicating position shown in FIG. 11A and an opening indicating position displaced from the closing indicating position by 90° in the rotation phase as shown in FIG. 12A. The stopper prevents the knob portion 62 from being rotated beyond this angular range.

The shaft portion 63 is rotationally inserted in the knob body 56 and is coupled to the knob portion 62 on the downstream end to be rotational integrally with the knob portion 62.

Further, in order to transmit movements of the operation knob 55 to the central upstream fins 28 and the shut-off damper 40, respectively, and to tilt these, the following configurations are employed.

As shown in FIGS. 2 and 6, a transmission portion 36 is formed integrally with the lateral coupling rod 35 in a section between the central upstream fins 28. The transmission portion 36 includes a transmission hole 37, which extends in the flowing direction of the air-conditioning air A1.

As shown in FIGS. 6 and 8, a transmission shaft 65 is inserted in the transmission portion 36. The transmission shaft 65 extends in the flowing direction of the air-conditioning air A1. The transmission shaft 65 has a disk-shaped contactor 66 having a diameter larger than the diameter of the transmission shaft 65 at the part inserted in the transmission hole 37.

The transmission hole 37 has a vertically elongated shape. This configuration is employed to allow the inner wall surfaces of the transmission hole 37 to transmit swinging motion of the transmission shaft 65 to the transmission portion 36 only when the transmission shaft 65 swings in the lateral direction about the upstream end as the operation knob 55 is slid.

Figure 4:
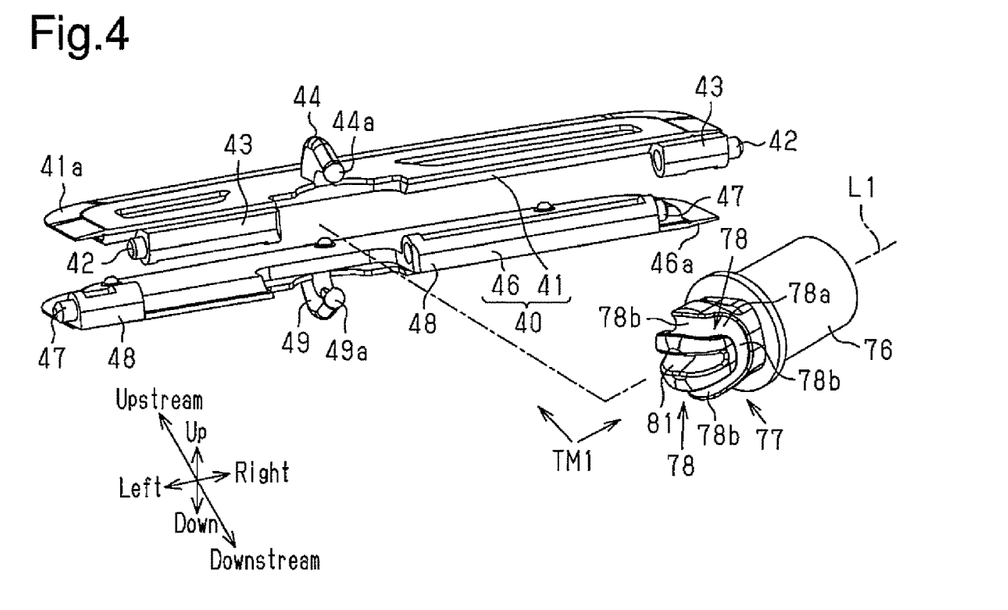
FIG. 4 is a perspective view of the shut-off damper and the cam member.

A rotation direction changing mechanism TM1 is provided between the transmission shaft 65 and the damper plates 41, 46. The rotation direction changing mechanism TM1 changes the direction of the rotation of the operation knob 55 transmitted through the transmission shaft 65 and transmits the rotation to the damper plates 41, 46. As shown in FIGS. 4 and 8, the rotation direction changing mechanism TM1 includes an arm portion 44, which is located on the upper damper plate 41, an arm portion 49, which is located on the lower damper plate 46, and a cam member 76.

The upper arm portion 44 extends downstream from the upper damper plate 41 in the intermediate portion in the lateral direction. The arm portion 44 curves to bulge upward and includes a sliding end portion 44a having a spherical surface. The sliding end portion 44a is located at the distal end, that is, the downstream end of the arm portion 44. The lower arm portion 49 extends downstream from the lower damper plate 46 in the intermediate portion in the lateral direction. The arm portion 49 curves to bulge downward and includes a sliding end portion 49a having a spherical surface. The sliding end portion 49a is located at the distal end, that is, the downstream end of the arm portion 49. As shown in FIGS. 11B and 12B, the sliding end portions 44a, 49a move along an arcuate passage T1 in accordance with tilting of the damper plates 41, 46. The arcuate passage T1 has a center C1 at the position that is aligned with the damper pivots 42, 47.

As shown in FIGS. 3 and 6, an outer cylinder member 74 is used to support the cam member 76 with the damper plates 41, 46. The outer cylinder member 74 includes a pair of pivots 75, which protrude in the lateral direction. The left pivot 75 is supported by the left bearing portion 43 on the upper damper plate 41. The right pivot 75 is supported by the right bearing portion 48 on the lower damper plate 46. In this manner, the outer cylinder member 74 is supported by the damper plates 41, 46.

The cam member 76 is rotationally mounted in the outer cylinder member 74. As shown in FIG. 4, the cam member 76 has a cam groove 77 on the outer surface. The sliding end portions 44a, 49a are slidably engaged with the cam groove 77. In the present embodiment, the cam groove 77 is formed along the entire circumference of the outer surface of the cam member 76 and has no end. As shown in FIGS. 4 and 5A to 5C, the cam groove 77 includes a pair of sliding regions 78. When the damper plates 41, 46 tilt between the open position and the closed position, the sliding end portions 44a, 49a slide along the sliding regions 78. The sliding regions 78 are positioned to face each other with an axis L1 of the cam member 76 in between. Each sliding region 78 is set to the angular range of 90° about the axis L1.

The cam groove 77 includes free running regions 78b on the opposite ends of each sliding region 78. The free running regions 78b are regions where, when the cam member 76 is rotated by a certain angle, the moving amount of the sliding end portions 44a, 49a along the arcuate passage T1 (refer to FIG. 12B) is less than that in an intermediate region 78a forming the intermediate section of each sliding region 78.

The free running regions 78b are formed in such a manner that when the sliding end portions 44a, 49a slide from one end to the other end of the respective free running regions 78b, the sliding end portions 44a, 49a move 3° to 5° on the arcuate passage T1 (refer to FIG. 12B) about the damper pivots 42, 47. With this configuration, one end and the other end of each free running region 78b are positioned apart from each other in the direction of the arcuate passage T1.

A recess 81 is formed on the outer surface of the cam member 76 at part of the region sandwiched between the sliding regions 78.

Figure 13A:
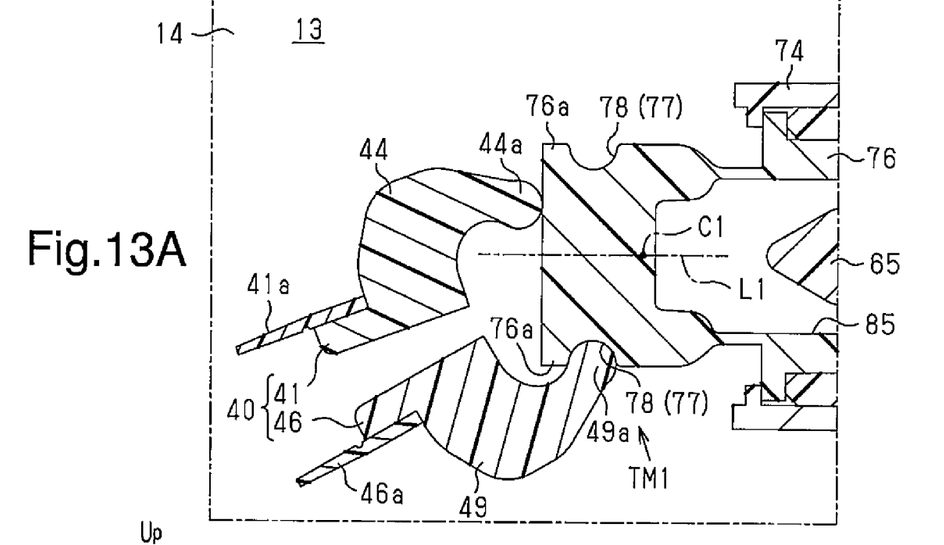
FIG. 13A is a partial cross-sectional side view showing a state in which the sliding end portion of the upper damper plate is detached from the cam groove according to a comparative example.
Figure 13B:
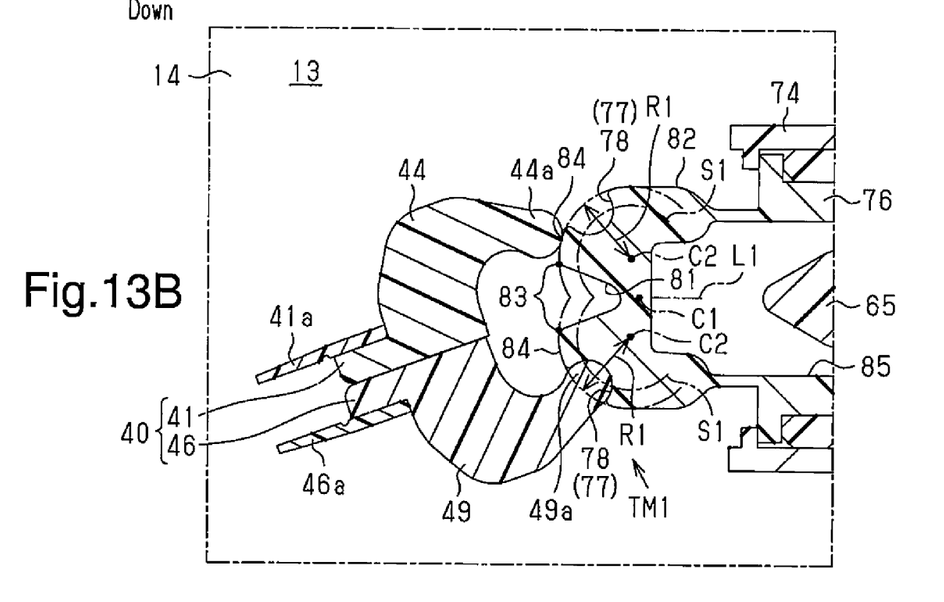
FIG. 13B is a partial cross-sectional side view of the present embodiment illustrated to compare with the comparative example.

As shown in FIGS. 12B and 13B, in the cam member 76 with the sliding regions 78 engaged with the sliding end portions 44a, 49a, a cross section 82, which includes the axis L1 and passes through the sliding end portions 44a, 49a, has curved portions 84. The curved portions 84 curve along the arcuate passage T1 (refer to FIG. 12B) between most upstream sections 83 of the cross section 82 and the sections of the sliding regions 78, where the sliding end portions 44a, 49a are engaged. The curved portions 84 are positioned between the recess 81 and the cam groove 77. In the present embodiment, in which the recess 81 is provided in the cam member 76, the boundaries between the recess 81 and the curved portions 84 serve as the most upstream sections 83. In the present embodiment, each curved portion 84 is configured by an arc having a constant radius R1. More specifically, the cam groove 77 is formed in such a manner that the center of the cam groove 77 is positioned on spherical surfaces S1 (refer to FIG. 13B), and the curved portions 84 are each formed by an arc that has the center at a center C2 of the associated spherical surface S1.

As shown in FIGS. 3 and 8, the downstream end of the transmission shaft 65 is coupled to the rotation member 61 of the operation knob 55 with a downstream-side Cardan joint J1 to be capable of bending and transmitting rotation. More specifically, two arm portions 67, which sandwich the axis of the transmission shaft 65, are formed on the downstream end of the transmission shaft 65. The upstream end of the rotation member 61 is formed by a support member 57. The support member 57 includes a support shaft 58, which extends in a direction orthogonal to the direction in which the arm portions 67 face each other. The arm portions 67 are coupled to the support shaft 58 with a coupling member 68. The coupling member 68 includes transmission pins 69, which protrude in the opposite directions from each other. The coupling member 68 is rotationally supported by the arm portions 67 with the transmission pins 69. The coupling member 68 has an engaging recess 71 and is rotationally supported by the support shaft 58 at the engaging recess 71. The arm portions 67, the support member 57, and the coupling member 68 configure the downstream-side Cardan joint J1.

The upstream end of the transmission shaft 65 is coupled to the cam member 76 with an upstream-side Cardan joint J2 to be capable of bending and transmitting rotation. The cam member 76 includes an engaging recess 85, which is open at the downstream end face. The engaging recess 85 includes a substantially cylindrical inner surface. Two engagement grooves 86 are formed on the inner surface of the engaging recess 85 at positions facing each other with the axis L1 of the cam member 76 in between. The pair of engagement grooves 86 (refer to FIG. 6) extend along the axis L1.

A disk-shaped engagement projection 72 is formed on the outer circumference of the upstream end of the transmission shaft 65. The engagement projection 72 includes transmission pins 73, which project in the radial direction and in the opposite directions from each other (refer to FIG. 6). The engagement projection 72 is slidably engaged with the cam member 76 with the outer surface of the engagement projection 72 in contact with the cylindrical inner surface of the engaging recess 85. The transmission pins 73 are engaged with the corresponding engagement grooves 86 of the cam member 76. The engagement grooves 86, the engagement projection 72, and the transmission pins 73 configure the upstream-side Cardan joint J2. In the upstream-side Cardan joint J2, the transmission shaft 65 is capable of swinging with respect to the cam member 76 about the engagement projection 72. The transmission shaft 65 is capable of transmitting the rotation of the transmission shaft 65 to the cam member 76 through the transmission pins 73. Further, the transmission pins 73 are movable in the flowing direction of the air-conditioning air A1 along the corresponding engagement grooves 86.

The operation and advantages of the above-described embodiment will now be described.

FIG. 11B illustrates a state in which the damper plates 41, 46 are both at the closed position. In this state, the airflow passage 13 is closed by the damper plates 41, 46. The flow of the air-conditioning air A1 is blocked in the section of the airflow passage 13 that is downstream of the damper plates 41, 46, so that the discharge of the air-conditioning air A1 from the outlet 17 is stopped.

In contrast, FIGS. 8 and 12B illustrate a state in which the damper plates 41, 46 are both at the open position. In this state, the airflow passage 13 is fully opened, so that the air-conditioning air A1 flows above the damper plate 41 and below the damper plate 46. After passing through the damper plates 41, 46, the air-conditioning air A1 flows along the upstream fin set and the downstream fin set and is then blown out through the outlet 17.

Switching of the shut-off damper 40 from the closed position to the open position and switching from the open position to the closed position are performed through rotation of the knob portion 62 in the operation knob 55 as shown in FIGS. 11A and 12A. When the knob portion 62 is rotated by an occupant, the rotation of the knob portion 62 is transmitted to the cam member 76 through the downstream-side Cardan joint J1, the transmission shaft 65, and the upstream-side Cardan joint J2 as shown in FIGS. 6 and 8. The cam member 76 is rotated about its axis L1, and the cam groove 77, which includes the pair of sliding regions 78, is also rotated about the axis L1 in accordance with the rotation of the cam member 76.

With the rotation of the cam groove 77, the positions in the sliding regions 78 where the sliding end portions 44a, 49a of the arm portions 44, 49 are engaged change along the arcuate passage T1, which has the center C1 aligned with the damper pivots 42, 47. With the changes in the engagement positions, the damper plates 41, 46 are tilted about the damper pivots 42, 47 between the open position and the closed position in the opposite directions from each other. The rotation member 61 of the operation knob 55 and the damper plates 41, 46 rotate and tilt in different directions. However, as described above, the rotation direction changing mechanism TM1 changes the direction of rotation of the rotation member 61 and transmits the rotation to the damper plates 41, 46, so that the damper plates 41, 46 are tilted. This tilting changes the opening degree of the airflow passage 13.

When the knob portion 62 is rotated to the closing indicating position shown in FIG. 11A, the upper damper plate 41 and the lower damper plate 46 reach the closed position as shown in FIG. 11B. The upper damper plate 41 is tilted to ascend toward the upstream end, and the sealing member 41a contacts the upper wall 15. The lower damper plate 46 is tilted to descend toward the upstream end, and the sealing member 46a contacts the bottom wall 16. In this manner, the damper plates 41, 46 bend about the damper pivots 42, 47 to close the airflow passage 13.

In contrast, when the knob portion 62 is rotated to the opening indicating position shown in FIG. 12A, the upper damper plate 41 reaches the open position and becomes substantially parallel with the upper wall 15. The lower damper plate 46 also reaches the open position and becomes substantially parallel with the bottom wall 16. The damper plates 41, 46 are arranged one above the other in the vertical direction to largely open the airflow passage 13.

As described above, by rotating the knob portion 62, it is possible to change the opening degree of the airflow passage 13 and adjust the amount of the air-conditioning air A1 passing through the shut-off damper 40 in the airflow passage 13.

In addition, when the transmission shaft 65 is rotated as described above, the rotation is not transmitted to the upstream fins 28, 29. This is because the contactor 66 is rotated in the transmission hole 37 in accordance with the rotation of the transmission shaft 65, and no force is transmitted between the contactor 66 and the transmission portion 36 as shown in FIGS. 6 and 8. Thus, the upstream fins 28, 29 are not tilted. Also, no force is transmitted between the operation knob 55 and the tubular portion 25. Thus, the downstream fins 18, 19 are not tilted, either.

In the following description, it is assumed that the shut-off damper 40 is arranged at the open position.

FIGS. 6 and 8 illustrate the air-conditioning register when the downstream fins 18, 19 are in a neutral state, and all the upstream fins 28, 29 are in the neutral state. At this time, the downstream fins 18, 19 are substantially parallel with the upper wall 15 and the bottom wall 16. The upstream fins 28, 29 are also substantially parallel with the left and right side walls 14.

Accordingly, after passing through the shut-off damper 40, the air-conditioning air A1 flows along the upstream fins 28, 29 and the side walls 14 and then flows along the downstream fins 18, 19, the upper wall 15, and the bottom wall 16 to be blown out straight from the outlet 17.

At this time, the operation knob 55 is located at the center in the lateral direction of the tubular portion 25 in the upper downstream fin 18. The axis of the shaft portion 63 in the rotation member 61 is substantially parallel with the upper wall 15 and the bottom wall 16 like the downstream fins 18, 19. The transmission shaft 65 is substantially parallel with the upper wall 15, the bottom wall 16, and the side walls 14.

Figure 10:
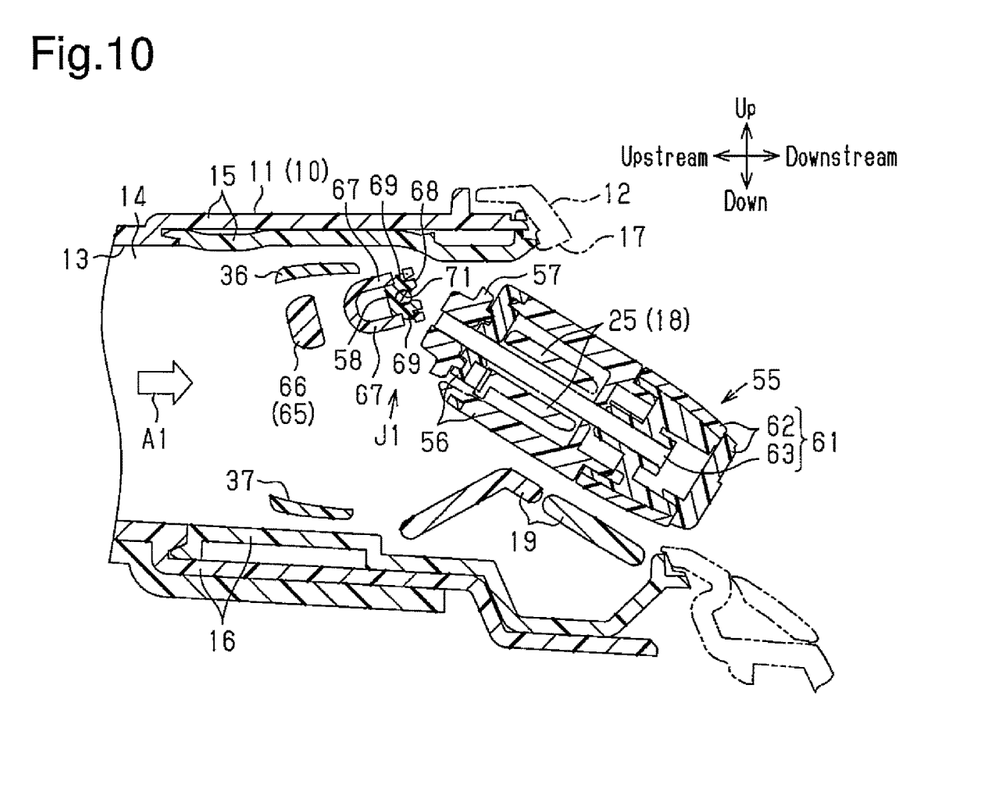
FIG. 10 is a partial cross-sectional side view of the air-conditioning register along a section different from FIGS. 8 and 9.

When a force in the vertical direction, for example, a downward force is applied to the operation knob 55 in the neutral states, the upper downstream fin 18 is tilted clockwise about the downstream fin pivots 21 as viewed in FIG. 10. The tilting motion is transmitted to the lower downstream fin 19 via the link mechanism LM1 (refer to FIG. 6). This tilts the lower downstream fin 19 in the direction in which the operation knob 55 is operated in synchronization with the upper downstream fin 18. The operation knob 55 and the downstream fins 18, 19 become inclined to descend toward the downstream end. When flowing along the tilted downstream fins 18, 19 as described above, the air-conditioning air A1 changes its direction and blows out obliquely downward from the outlet 17.

The tilting motion of the operation knob 55 is transmitted to the transmission shaft 65 via the downstream-side Cardan joint J1. Therefore, the transmission shaft 65 swings vertically about the pivots 75 of the outer cylinder member 74, which are engaged with the damper plates 41, 46. For example, when a downward force is applied to the operation knob 55 as described above, the shaft portion 63 is inclined to ascend toward the upstream end. Consequentially, the transmission shaft 65 is inclined to ascend toward the downstream end.

However, the swinging motion of the transmission shaft 65 is not transmitted to the upstream fins 28, 29. This is because the contactor 66 of the transmission shaft 65 moves in the above-described direction (upward) in the transmission hole 37 in accordance with the swinging motion, and force is not transmitted between the contactor 66 and the transmission portion 36. The upper and lower inner wall surfaces of the transmission hole 37 contact neither the contactor 66 nor the portion of the transmission shaft 65 different from the contactor 66. As a result, none of the upstream fins 28, 29 are tilted.

Figure 7:
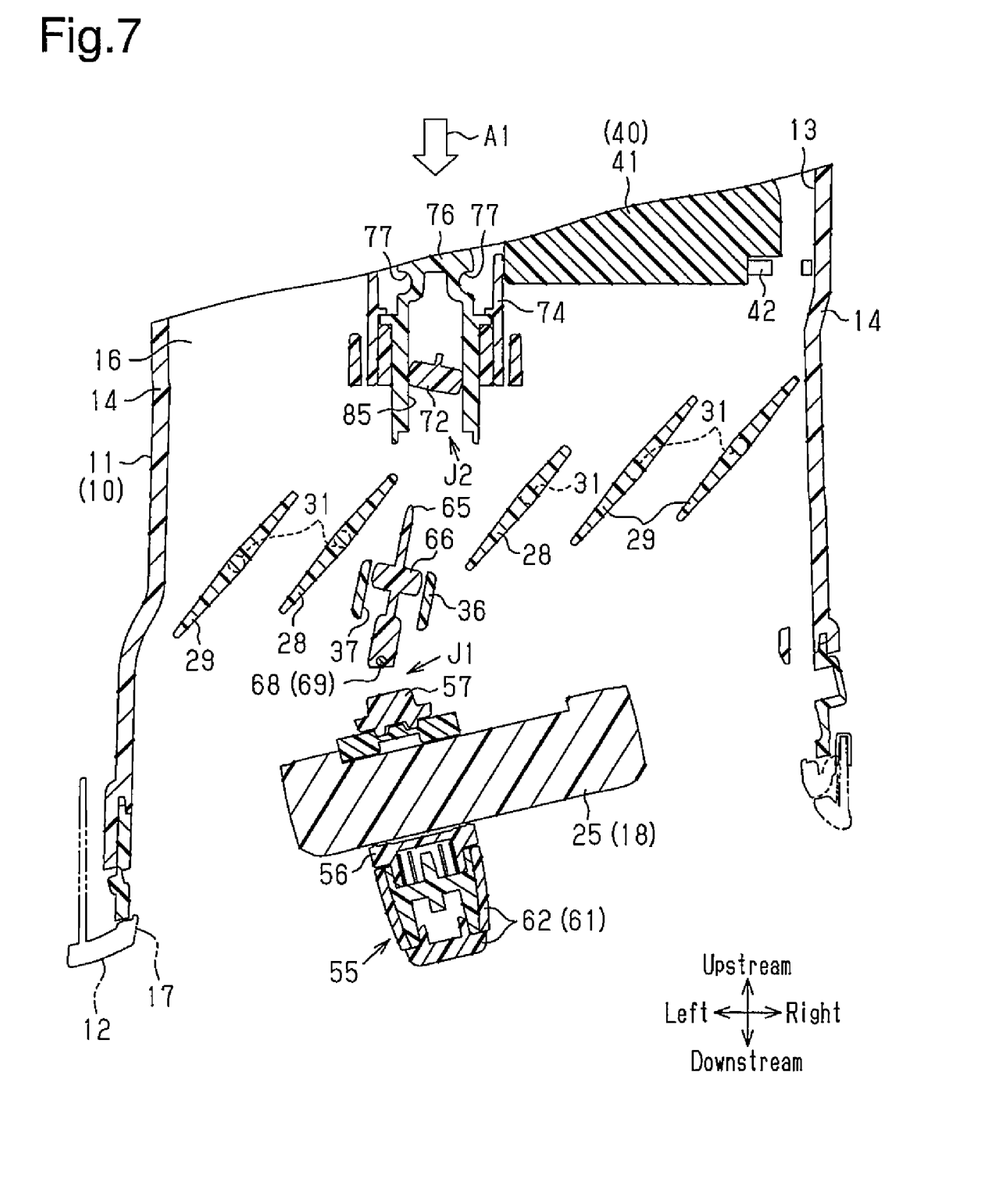
FIG. 7 is a partial cross-sectional plan view of the air-conditioning register along a section different from FIG. 6.

Further, when a force directed in the lateral direction, for example, a leftward force is applied to the operation knob 55 in the neutral states, the operation knob 55 is slid leftward together with the downstream-side Cardan joint J1 as shown in FIG. 7. This swings the transmission shaft 65 in the above direction (leftward) about the engagement projection 72.

The swinging motion of the transmission shaft 65 is transmitted to the lateral coupling rod 35. This is because the contactor 66 of the transmission shaft 65 contacts the left and right inner wall surfaces of the transmission hole 37 in the transmission portion 36 in accordance with the swinging motion, and force is transmitted between the contactor 66 and the transmission portion 36. This moves the transmission portion 36 leftward together with other parts of the lateral coupling rod 35. This motion is transmitted to the upstream fins 28, 29. As a result, the upstream fins 28, 29 are tilted clockwise about the upstream fin pivots 31 as shown in FIG. 7.

When flowing along the tilted upstream fins 28, 29 as described above, the air-conditioning air A1 changes its direction and blows out leftward from the outlet 17.

The above is the operation when the operation knob 55 is tilted or slid from the neutral states of the upstream fins 28, 29 and the downstream fins 18, 19 as a reference. However, when the operation knob 55 is tilted or slid from a state different from the neutral states, the respective parts of the air-conditioning register operate in the same manner as described above. Further, the knob portion 62 can be rotated to tilt the shut-off damper 40 even if the upstream fins 28, 29 are inclined with respect to the side walls 14, or even if the downstream fins 18, 19 are inclined with respect to the upper wall 15 and the bottom wall 16. This is because the downstream end of the transmission shaft 65 is coupled to the rotation member 61 with the downstream-side Cardan joint J1, and the upstream end is coupled to the cam member 76 with the upstream-side Cardan joint J2. Force is transmitted even if the axis of the transmission shaft 65 intersects with the axis of the rotation member 61. Also, force is transmitted even if the axis of the transmission shaft 65 intersects with the axis L1 of the cam member 76.

As described above, by operating the operation knob 55, which has the rotation member 61, the downstream fins 18, 19, the upstream fins 28, 29, and the shut-off damper 40 can be tilted independently.

Assume that the moving amount of the sliding end portions 44a, 49a along the arcuate passage T1 of the cam groove 77 is uniform when the cam member 76 is rotated by a certain angle. If the operation knob 55 is rotated in a state in which the intersecting angle between the axis of the operation knob 55 and the axis of the transmission shaft 65 is great, or the intersecting angle between the axis of the transmission shaft 65 and the axis L1 of the cam member 76 is great, the rotational misalignment caused between the operation knob 55 and the cam member 76 is increased.

Figure 5A:
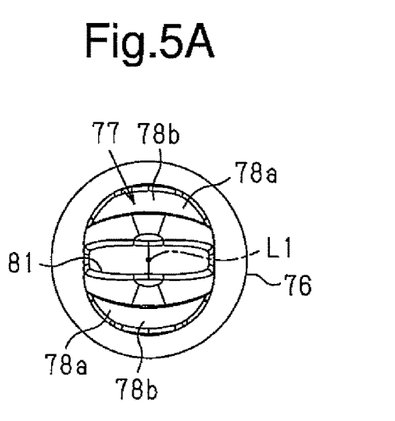
FIG. 5A is a rear view of the cam member.
Figure 5B:
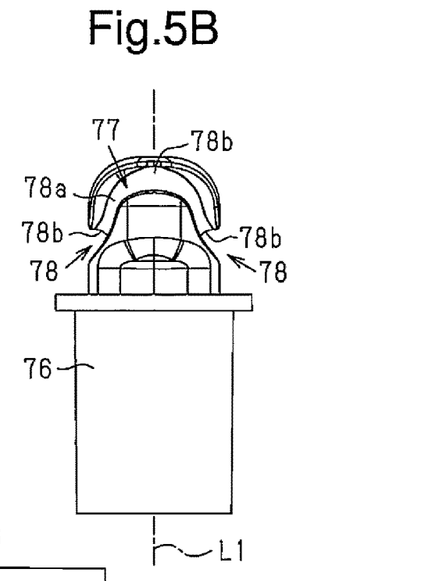
FIG. 5B is a plan view of the cam member.
Figure 5C:
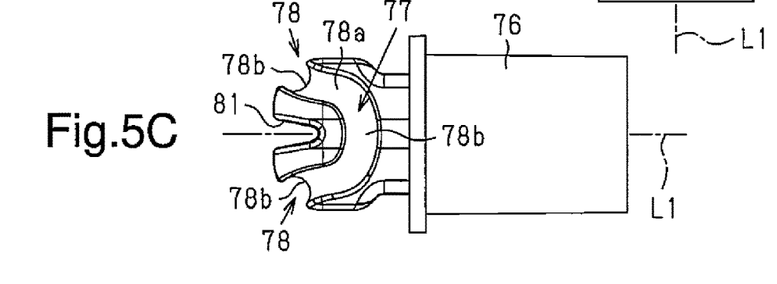
FIG. 5C is a side view of the cam member.

In this respect, in the present embodiment, as shown in FIGS. 5A to 5C, the cam groove 77 includes the free running regions 78b on opposite ends of each sliding region 78. In each free running region 78b, the moving amount of the sliding end portions 44a, 49a along the arcuate passage T1 (refer to FIG. 12B) when the cam member 76 is rotated by a certain angle is less than that in the intermediate regions 78a. More specifically, when each of the sliding end portions 44a, 49a slides from one end to the other end of the associated free running region 78b, the sliding end portions 44a, 49a move along the arcuate passage T1 about the damper pivots 42, 47 by 3° to 5°. When the sliding end portions 44a, 49a are located at one end and the other end of the free running regions 78b, the sliding end portions 44a, 49a are located apart from each other in the direction of the arcuate passage T1.

Thus, when the sliding end portions 44a, 49a of the damper plates 41, 46 slide along the free running regions 78b, the inclination angle of the damper plates 41, 46 about the damper pivots 42, 47 is less than that when the sliding end portions 44a, 49a slide along the intermediate regions 78a. In other words, when the sliding end portions 44a, 49a slide along the corresponding free running regions 78b, the damper plates 41, 46 are gently tilted compared with a case in which the sliding end portions 44a, 49a slide along the intermediate regions 78a, or the damper plates 41, 46 do not tilt.

Thus, the free running regions 78b absorb the rotational misalignment caused by the intersecting angle between the axes of the transmission shaft 65 and the operation knob 55, or the intersecting angle between the axes of the transmission shaft 65 and the cam member 76. This eliminates phenomenon caused by the misalignment.

For example, when the knob portion 62 is rotated to the closing indicating position shown in FIG. 11A, the damper plates 41, 46 are inhibited from tilting beyond the closed position. The damper plate 41 is prevented from contacting the upper wall 15, and the damper plate 46 is prevented from contacting the bottom wall 16. This prevents load from being applied to the operation knob 55, the rotation direction changing mechanism TM1, and parts located between the operation knob 55 and the rotation direction changing mechanism TM1.

In contrast, the air-conditioning air A1 is prevented from leaking through gaps that may be created between the damper plate 41 and the upper wall 15 or between the damper plate 46 and the bottom wall 16 if the damper plates 41, 46 did not tilt to the closed position and failed to block the airflow passage 13.

Also, for example, when the knob portion 62 is rotated to the opening indicating position shown in FIG. 12A, the damper plates 41, 46 are prevented from not tilting to the open position and being inclined with respect to the flowing direction of the air-conditioning air A1. This prevents the damper plates 41, 46 from resisting the flow of the air-conditioning air A1 and prevents the discharge amount from being reduced.

The above-described advantage of absorbing the rotational misalignment with the free running regions 78b is the most effective if the free running regions 78b are located at any positions that are identical in the arcuate passage T1. This is because the damper plates 41, 46 do not tilt when the sliding end portions 44a, 49a slide along the cam groove 77 in the free running regions 78b.

However, as in the present embodiment, even if one end and the other end of each free running region 78b are separated from each other in the direction of the arcuate passage T1, the rotational misalignment is absorbed if one end and the other end are separated by approximately 3° to 5° on the arcuate passage T1.

In the air-conditioning register, a force may be applied to the damper plates 41, 46 that are located at a position different from the closed position, for example, that are at rest at the open position as illustrated in FIG. 12B, in the thickness direction of the damper plates 41, 46. For example, if a downward force is applied, the damper plates 41, 46 tilt downward about the damper pivots 42, 47. As illustrated in FIG. 13A, the sliding end portion 44a of the upper damper plate 41 is detached from the cam groove 77. In this case, the rotation direction changing mechanism TM1 no longer changes the rotation direction properly.

However, the sliding end portion 49a of the lower damper plate 46 is kept engaged with the cam groove 77. This is because the sliding end portion 49a moves along the arcuate passage T1 in accordance with the tilting of the lower damper plate 46 about the damper pivots 47, the engagement position between the sliding end portion 49a and the cam groove 77 is changed, and the cam member 76 is rotated.

In this state, if the operation knob 55 is rotated toward the opening indicating position, that is, in a direction that causes the damper plates 41, 46 to tilt toward the open position, the cam member 76 is rotated, and the lower damper plate 46 engaged with the cam groove 77 at the sliding end portion 49a is tilted. The upper damper plate 41 with the sliding end portion 44a detached from the cam groove 77 is pushed upward by the lower damper plate 46. The upper damper plate 41 is tilted upward along the arcuate passage T1 about the damper pivots 42.

If there were any section that hinders the movement of the sliding end portion 44a between the sliding end portion 44a and the cam groove 77, it would be difficult to engage the sliding end portion 44a with the cam groove 77. For example, FIG. 13A illustrates a case in which the outer circumferential surface of the cam member 76 is cylindrical and has the center aligned with the axis L1. The upstream end face of the cam member 76 is a flat surface orthogonal to the axis L1, and the cam groove 77 is formed on the outer circumferential surface. In this case, a corner 76a between the outer circumferential surface and the upstream end face hinders the movement of the sliding end portion 44a. In a state in which the movement of the sliding end portion 44a is hindered, if a force is applied to the operation knob 55 to rotate the operation knob 55 further toward the opening indicating position, the sliding end portion 49a, which is engaged with the cam groove 77, may possibly also be detached from the cam groove 77.

In this respect, in the present embodiment, as illustrated in FIG. 13B, the cross section 82 of the cam member 76 including the axis L1 and passing through the sliding end portions 44a, 49a includes the curved portions 84 between the most upstream sections 83 and parts of the sliding regions 78 engaged with the sliding end portions 44a, 49a. The curved portions 84 curve along the arcuate passage T1. This configuration achieves a state where there is no section that hinders the movement of the sliding end portion 44a between the sliding end portion 44a and the cam groove 77 or a state similar to the above. Thus, when the upper damper plate 41 that is pushed by the lower damper plate 46 tilts upward along the arcuate passage T1 about the damper pivots 42, the sliding end portion 44a moves along the associated curved portion 84 and is engaged again with the cam groove 77 as illustrated in FIG. 12B. In this manner, the sliding end portions 44a, 49a both get engaged with the cam groove 77.

In particular, in the present embodiment, each curved portion 84 is configured by an arc having the constant radius R1. Thus, when the upper damper plate 41 tilts upward along the arcuate passage T1 about the damper pivots 42, a force that is required to move the sliding end portion 44a along the associated curved portion 84 is substantially constant at any position on the curved portion 84. Thus, it is possible to more smoothly move the sliding end portion 44a to be engaged with the cam groove 77.

If an upward force is applied to the damper plates 41, 46 of FIG. 12B, and the sliding end portion 49a is detached from the cam groove 77, the sliding end portion 49a will be engaged with the cam groove 77 again in the similar manner as described above by rotating the operation knob 55 toward the opening indicating position.

As a result, the rotation direction changing mechanism TM1 properly changes the rotation direction.

The above-described embodiment may be modified as follows.

The downstream-side Cardan joint J1 may have any configuration as long as the rotation member 61 of the operation knob 55 and the transmission shaft 65 are coupled in such a manner that the intersecting angle of the axes can be changed freely. Thus, in addition to the universal joint as described above, a different type of a joint, for example, a ball joint may be employed as the downstream-side Cardan joint J1.

The shut-off damper 40 may be configured by a single damper plate. In this case, the number of the arm portion including the sliding end portion, and the number of the sliding region 78 in the cam groove 77 may be changed from two to one.

In the above-described embodiment, the cam groove 77 includes regions that are not involved in sliding of the sliding end portions 44a, 49a. The regions not involved in the sliding may be omitted, and the cam groove 77 may be configured only by the sliding regions 78. In this case, two cam grooves 77 are provided to face each other with the axis L1 in between.

The curved portions 84 may be omitted from the cross section 82 of the cam member 76.

The above-described embodiment employs the configuration for limiting the rotation of the rotation member 61 of the operation knob 55 between the closing indicating position and the opening indicating position. Thus, the damper plates 41, 46 are tilted between the open position and the closed position by rotating the rotation member 61 forward and reverse between the closing indicating position and the opening indicating position. However, the limit of the rotation region is not an absolute necessity and may be removed. In this case, the rotation member 61 is rotated in one direction only. With this modification also, if the cam groove 77 is formed along the entire circumference of the outer circumferential surface of the cam member 76 and has no end as in the above-described embodiment, it is possible to tilt the damper plates 41, 46 between the open position and the closed position.

In the above-described embodiment, the damper plates 41, 46 are tilted between the closed position and the open position by rotating the rotation member 61 of the operation knob 55 between the closing indicating position and the opening indicating position by 90° to rotate the cam member 76 by 90°. Instead, the damper plates 41, 46 may be tilted between the closed position and the open position by rotating the rotation member 61 of the operation knob 55 between the closing indicating position and the opening indicating position at an angle different from 90°, for example, 180° to rotate the cam member 76 by an angle different from 90° (180°).

The recess 81 of the cam member 76 may be omitted.

The numbers of the downstream fins 18, 19 and the upstream fins 28, 29 may be changed from the above-described embodiment.

The downstream fins 18, 19 may be configured by plates that extend in the vertical direction and the flowing direction of the air-conditioning air A1 in the airflow passage 13. The upstream fins 28, 29 may be configured by plates that extend in the lateral direction and the flowing direction of the air-conditioning air A1 in the airflow passage 13.

The air-conditioning register may be provided at a position in the passenger compartment other than the instrument panel.

As long as the above-described air-conditioning register is capable of changing the direction of the air-conditioning air A1, which is delivered from an air conditioner, with the upstream fins 28, 29 and the downstream fins 18, 19, blowing it into a compartment, and blocking the blow with the shut-off damper 40, the air-conditioning register does not necessarily need to be used in vehicles, but is applicable to wide variety of usages.

The invention claimed is:

1. An air-conditioning register comprising a rotation direction changing mechanism, which changes a rotation direction of an operation knob transmitted through a transmission shaft extending in a flowing direction of air-conditioning air in an airflow passage and transmits the rotation to a shut-off damper to tilt the shut-off damper between an open position and a closed position about damper pivots, wherein
the rotation direction changing mechanism includes an arm portion, which extends from the shut-off damper, and a cam member, which includes a cam groove on an outer surface,
the arm portion includes a sliding end portion, which moves along an arcuate path in accordance with the tilting motion of the shut-off damper,
the arcuate path has a center that coincides with the damper pivots,
the sliding end portion is slidably engaged with the cam groove,
the transmission shaft is coupled to the operation knob with a first joint,
the transmission shaft is coupled to the cam member with a second joint,
the cam groove includes a sliding region, along which the sliding end portion slides when the shut-off damper is tilted between the open position and the closed position,
the sliding region includes a free running region on each of opposite ends of the sliding region, wherein a moving amount of the sliding end portion along the arcuate path in each free running region is less than that in an intermediate region at an intermediate section of the sliding region when the cam member is rotated by a certain angle,
the cam groove is formed along an entire circumference of the outer surface of the cam member, and
one end and the other end of each free running region are provided at positions that are on the arcuate path and apart from each other.

2. The air-conditioning register according to claim 1, wherein
the shut-off damper includes two damper plates, which are tilted by the rotation direction changing mechanism in opposite directions from each other between an open position and a closed position about the damper pivots,
the sliding region is one of two sliding regions located to face each other with an axis of the cam member in between,
the free running regions are provided on opposite ends of each sliding region,
the arm portion of the rotation direction changing mechanism is provided on each of the damper plates, and
the sliding end portion of each arm portion is slidably engaged with the cam groove in the corresponding sliding region.

3. The air-conditioning register according to claim 1, wherein one end of each free running region is provided at a position that is on the arcuate path and separated from the other end by 3° to 5° about the damper pivots serving as a center of rotation.

4. The air-conditioning register according to claim 1, wherein the first joint is a universal joint that is capable of bending and transmitting rotation, and the second joint is a universal joint that is capable of bending and transmitting rotation.

* * * * *